(No Model.)
E. TILSTON.
PEDAL FOR VELOCIPEDES.
No. 512,525. Patented Jan. 9, 1894.
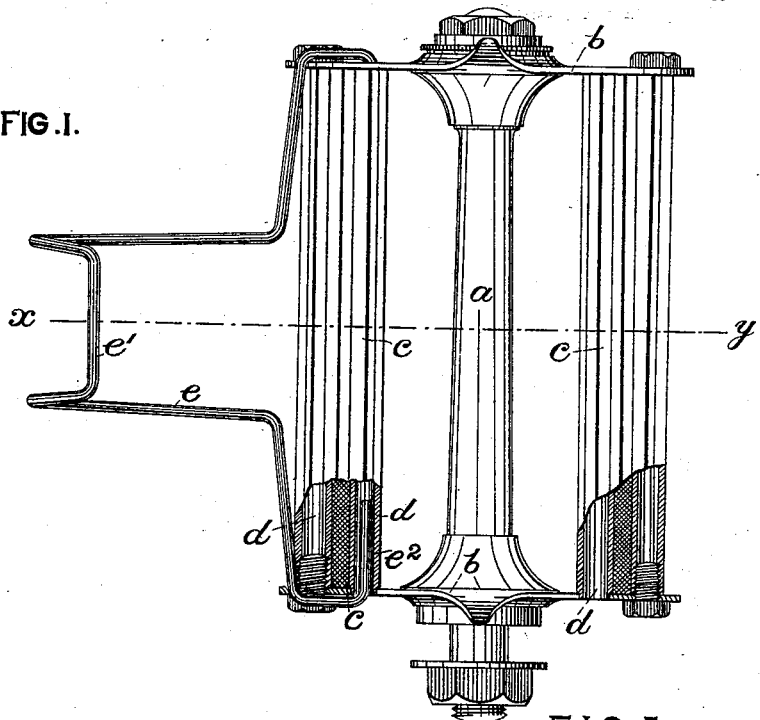
FIG.1.
FIG.5. FIG.6.
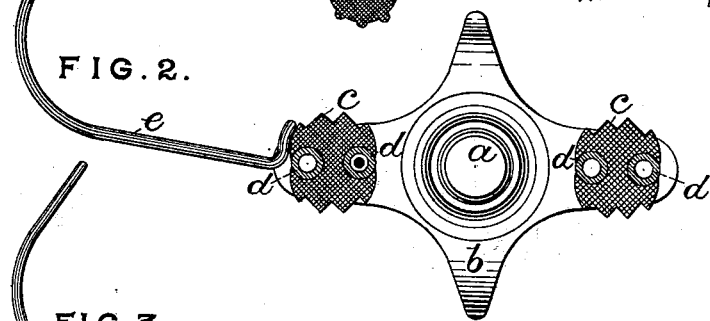
FIG.4.
FIG.2.
FIG.3.
Witnesses.
C. D. Davis
W. R. Davis
Inventor.
Edward Tilston
by
W. H. Babcock
Attorney
THE NATIONAL LITHOGRAPHING COMPANY,
WASHINGTON, D. C.

UNITED STATES PATENT OFFICE.

EDWARD TILSTON, OF MANCHESTER, ENGLAND.

PEDAL FOR VELOCIPEDES.

SPECIFICATION forming part of Letters Patent No. 512,525, dated January 9, 1894.

Application filed September 25, 1893. Serial No. 486,461. (No model.)

*To all whom it may concern:*

Be it known that I, EDWARD TILSTON, a subject of the Queen of Great Britain and Ireland, and a resident of 6 Industrial Street, Charlton-on-Medlock, Manchester, in the county of Lancaster, England, have invented certain Improvements in Pedals for Velocipedes, of which the following is a specification.

My invention relates to improvements in pedals for velocipedes.

The first part of my said invention has for its object an improved method of securing the rubbers.

The second part has for its object an improved toe clip or guard for preventing the foot slipping across the pedal when riding.

In the accompanying drawings Figure 1 is a plan partly in section. Fig. 2 is a section through $x\,y$ of Fig. 1. Fig. 3 is a side elevation showing the mode of attachment of the toe clip. Figs. 4, 5 and 6 represent modifications to be hereinafter referred to.

In the drawings $a$ is the spindle on which the side plates $b$ of the pedal are mounted in the usual manner.

In pedals having india rubber or other similar elastic parts for the foot to rest on as heretofore constructed it has been usual to form such parts as bars secured by bars, bolts or pins passing through the rubber parts.

According to the first part of my invention the elastic bars or rubbers on which the foot rests are secured by lateral binding pieces taking into lateral recesses or depressions in the elastic bars.

When using solid rubbers I use the construction shown in Figs. 1 and 2 in which $c$ are the rubbers having lateral recesses in which engage hollow tubes $d$ secured by riveting or by screws to the side plates $b$.

When using hollow rubbers I take a tube as $g$ Fig. 5 having thick walls and compress the same between the lateral supports $d$ as shown in Fig. 6.

A modification is shown in Fig. 4 in which instead of hollow tubes I use dished side plates $d'$ to grip the rubbers $c'$ which in this case may be divided so that either half of the rubber may be readily replaced. When the rubbers are thus secured by gripping between lateral supports they are more effective as vibration destroying agents than when secured by pins, bolts or other fastening pieces passing through the rubber. A less weight of rubber may be used and the pedal is thus considerably lightened.

The second part of my invention consists of a bent spring guard $e$ formed at the part $e'$ to curve over the toe and having in-curved or inwardly projecting ends $e^2$ which are sprung into and engage with orifices or sockets formed in the side plates $b$. Where the tubular lateral supports $d$ are used for the rubber the ends thereof form convenient receptacles for the guard. To keep the guard in position one side is preferably curved over the bolt $f$ which holds the side plate $b$ while the other side is curved under as illustrated in Fig. 3.

What I claim as my invention, and desire to secure by Letters Patent, is—

1. In a velocipede pedal the combination of the side plates $b$ the rubbers $c$ the hollow lateral supports $d$ engaging therewith and the toe clip $e$ substantially as set forth.

2. In a velocipede pedal, the combination of a rubber having tubular parts set into the same, with a bent resilient toe-clip having its ends inserted into said tubular parts and suitable supporting and fastening devices, substantially as set forth.

In testimony whereof I have signed my name to this specification in the presence of two subscribing witnesses.

EDWARD TILSTON.

Witnesses:
EDWARD TURNER WHITELOW,
JOHN HALL.